(12) United States Patent
Wouhaybi et al.

(10) Patent No.: US 10,142,771 B2
(45) Date of Patent: Nov. 27, 2018

(54) VIRTUAL SENSOR APPARATUS AND METHOD

(71) Applicant: Intel Corporation, Santa Clara, CA (US)

(72) Inventors: Rita H. Wouhaybi, Portland, OR (US); Stanley Mo, Portland, OR (US); Tobias M. Kohlenberg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 860 days.

(21) Appl. No.: 14/554,880

(22) Filed: Nov. 26, 2014

(65) Prior Publication Data

US 2016/0150368 A1    May 26, 2016

(51) Int. Cl.
*H04W 24/00*    (2009.01)
*H04W 4/021*    (2018.01)
*H04W 4/02*    (2018.01)

(52) U.S. Cl.
CPC ........... *H04W 4/021* (2013.01); *H04W 4/025* (2013.01); *H04W 4/02* (2013.01)

(58) Field of Classification Search
CPC .............................. H04W 4/021; H04W 4/025
USPC ....................................................... 455/456.1
See application file for complete search history.

(56) References Cited

U.S. PATENT DOCUMENTS

| | | | |
|---|---|---|---|
| 7,738,884 B2 * | 6/2010 | Cheung ................. | G01S 5/0226 455/404.2 |
| 2012/0223880 A1 * | 9/2012 | Birnbaum ............... | G06F 3/015 345/156 |

| | | | |
|---|---|---|---|
| 2013/0159223 A1 | 6/2013 | Bahl et al. | |
| 2013/0307874 A1 | 11/2013 | Blanchflower et al. | |
| 2014/0025338 A1 | 1/2014 | Blount et al. | |

(Continued)

FOREIGN PATENT DOCUMENTS

| | | | |
|---|---|---|---|
| WO | WO2014-160479 A1 | 10/2014 | |
| WO | WO2014-182900 A1 | 11/2014 | |

OTHER PUBLICATIONS

International Search Report and Written Opinion dated Apr. 22, 2016 for International Application No. PCT/US2015/057399, 17 pages.

(Continued)

*Primary Examiner* — Charles Shedrick
(74) *Attorney, Agent, or Firm* — Schwabe, Williamson & Wyatt, P.C.

(57) ABSTRACT

Apparatuses, methods and storage medium associated with provision and receipt of virtual sensor service, are disclosed. In embodiments, an apparatus may comprise a virtual sensor server configured to provide virtual sensor service to one or more mobile client devices to virtualize one or more sensors of each of the one or more mobile client devices. Virtualization of the one or more sensors of each of the one or more mobile client devices may comprise provision of sensor data to each of the one or more mobile client devices, or reporting of sensor data to one or more recipients external to the one or more mobile client devices on behalf of respective one or ones of the one or more mobile client devices. The provision or the reporting supersedes the corresponding sensor on the respective one or more of the mobile client devices. Other embodiments may be described and/or claimed.

25 Claims, 7 Drawing Sheets

*Legend: Italics denote optional*

(56) References Cited

U.S. PATENT DOCUMENTS

2014/0162692 A1\* 6/2014 Li .......................... H04L 67/40
                                                           455/456.3
2016/0086496 A1\* 3/2016 Resnick ............... G08G 5/0013
                                                            701/120

OTHER PUBLICATIONS

Extended European Search Report dated May 25, 2018 for European Application No. 15862803.2, 11 pages.
Nico Deblauwe et al., "Combining GPS and GSM Cell-ID position for Proactive Location-based Services", Mobile and Ubiquitous Systems: Networking&Services, 2007. Mobiquitous 2007. Fourth Annual International Conference on, IEEE, Piscataway, NJ, Aug. 6, 2007, 7 pages.
Ulrich Bareth et al., "Energy-Efficient Position Tracking in Proactive Location-Based Services for Smartphone Environments", Computer Software and Applications Conference (COMPSAC), 2011 IEEE 35th Annual, IEEE, Jul. 18, 2011, 6 pages.

\* cited by examiner

Legend: Italics denote optional

VIRTUAL SENSOR APPARATUS AND METHOD

TECHNICAL FIELD

The present disclosure relates to the field of data processing. More particularly, the present disclosure relates to virtualizing sensors on mobile client devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In many settings (airplanes, corporate campuses, government buildings, entertainment/sport venues, or even homes), it is often required or at least desirable not to have a large number of employees, visitors, attendees or residents broadcasting their whereabouts, e.g., to a mapping service. In addition to the fact that the continuing broadcast may be a power problem for the mobile devices, the continuing broadcast may be introducing security and/or privacy issues, as the devices' movements could be profiled to determine patterns and/or information that is classified or confidential.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
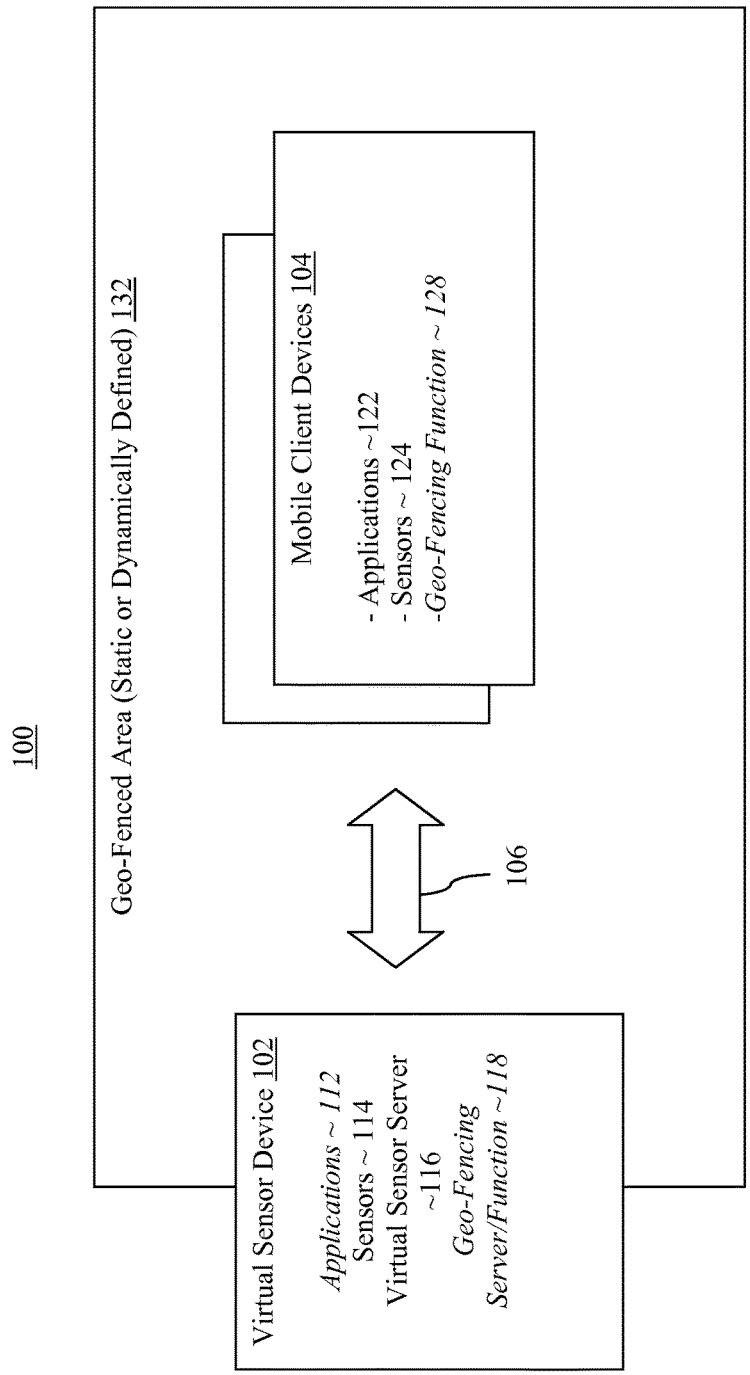
FIG. 1 illustrates an example operating environment incorporated with teachings of the present disclosure, according to the disclosed embodiments.

Apparatuses, methods and storage medium associated with provision and receipt of virtual sensor service, are disclosed. In embodiments, an apparatus may comprise a virtual sensor server configured to provide virtual sensor service to one or more mobile client devices to virtualize one or more sensors of each of the one or more mobile client devices. Virtualization of the one or more sensors of each of the one or more mobile client devices may comprise provision of sensor data to each of the one or more mobile client devices, or reporting of sensor data to one or more recipients external to the one or more mobile client devices on behalf of respective one or ones of the one or more mobile client devices. The provision or the reporting supersedes the corresponding sensors on the respective one or more of the mobile client devices.

In embodiments, a mobile client device may include one or more sensors, and an application or a geo-fencing function. The application or geo-fencing function may be configured to apply a configuration or operation policy to the one or more sensors, and receive virtual sensor service from a virtual sensor device, external to the mobile client device, to virtualize and supersede the one or more sensors of the mobile client device. The configuration or operation policy may be provided by e.g., the virtual sensor device, and may include, e.g., idling or powering off the superseded sensors.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an example operating environment incorporated with the teachings of the present disclosure, in accordance with various embodiments, is shown. As illustrated, in embodiments, operating environment 100 may include a virtual sensor device 102 and one or more mobile client devices 104 communicatively coupled with each other via one or more communication links 106. Mobile client devices 104 may each include one or more sensors 124, and one or more applications 122 configured to use sensor data output by sensors 124. Examples of sensors 124 may include, but are not limited to, global positioning system (GPS) sensors configured to receive and provide location data for applications 122 (which may in turn report the location data to an external recipient, e.g., a map service, or a commerce website), or an accelerometer/gyroscope configured to output acceleration, motion and/or orientation data for applications 122. Examples of applications 122 map include, but are not limited to, social media applications, map applications, games, and so forth. Communication links may include one or more wired or wireless communication links. Examples of wired communication links may include, but are not limited to Transmission Control Protocol/Internet Protocol (TCP/IP), Ethernet, and so forth. Examples of wireless communication links may include, but are not limited to, 3G/4G/5G, WiFi, Bluetooth®, Near Field Communication (NFC), and so forth. Further, virtual sensor device 102 may be configured with corresponding sensors 114 and virtual sensor server 116 configured to provide a virtual sensor service to mobile client devices 104 to virtualize their sensors 124. Virtualization of sensors 124 may include, but are not limited to, provision of corresponding sensor data (e.g., GPS data) to mobile client devices 104, or reporting sensor data (e.g., location data) to external recipients on behalf of mobile client devices 104; wherein the provision and/or reporting supersedes sensors 124. In other words, while virtualized, sensors 124 may be placed into a reduced power operational state, a low power standby/idle state or a powered off/shut down state. These and other aspects will be described in more detail below.

Continuing to refer to FIG. 1, in embodiments, virtual sensor device 102 may be configured with sensors 114 and virtual sensor server 116 to provide virtual sensor service to mobile client devices 104 within a geo-fenced area 132, which may be statically or dynamically defined. For examples, virtual sensor device 102 may be a corporate/business infrastructure server configured to provide virtual sensor service to mobile client devices 104 entering a geo-fenced corporate campus area, entertainment/sport venue, and so forth, that are statically pre-defined, a home appliance configured to provide virtual sensor service to mobile client devices 104 entering the geo-fenced residential area, or another mobile client device.

Among these embodiments, as illustrated, virtual sensor device 102 and mobile client devices 104 may further respectively include geo-fencing server 118 and geo-fencing functions 128. Geo-fencing server 118 may be configured to broadcast notifications of geo-fenced area 132, including e.g., its coordinates. Geo-fencing functions 128, on the other hand, may be configured to monitor and detect for geo-fencing notifications, determine whether mobile client devise 104 are within geo-fenced area 132, and on determination that mobile client devices 104 are within geo-fenced area 132, report presence of mobile client devices 104 to geo-fencing server 118. Geo-fencing server 118 may be additionally configured to notify virtual sensor server 116 of the reported presences.

Further, virtual sensor server 116 or geo-fencing server 118 (or both in cooperation with each other) may be configured to provide to mobile client devices 104, one or more configuration and/or operational policies that govern the configuration and/or operation of sensors 124, while mobile client devices 104 are within geo-fenced area 132, and sensors 124 are being virtualized. The configuration and/or operational policies may be provided to mobile client devices 104, e.g., via geo-fencing functions 128. Examples of configuration and/or operational policies may include policies that call for the placement of sensors 124 in a reduced power scaled back operational state, a low power standby/idle state, or a powered off/shut down state, and so forth. Correspondingly, geo-fencing functions 128 may be configured to apply or cause to be applied the configuration and/or operational policies that govern the configuration and/or operation of sensors 124, while mobile client devices 104 are within the geo-fenced area 132. In embodiments, geo-fencing functions 128 may be disposed with the operating systems (not shown) of mobile client devices 104.

In embodiments, virtual sensor server 116 may be further configured to provide auxiliary data to mobile client devices 104, while providing virtual sensor service to mobile client devices 104. Examples of auxiliary data may include, but are not limited to, more detailed maps or directions within a geo-fenced corporate campus area, or commercials/coupons relevant to a geo-fenced entertainment/sport venue.

Figure 2:
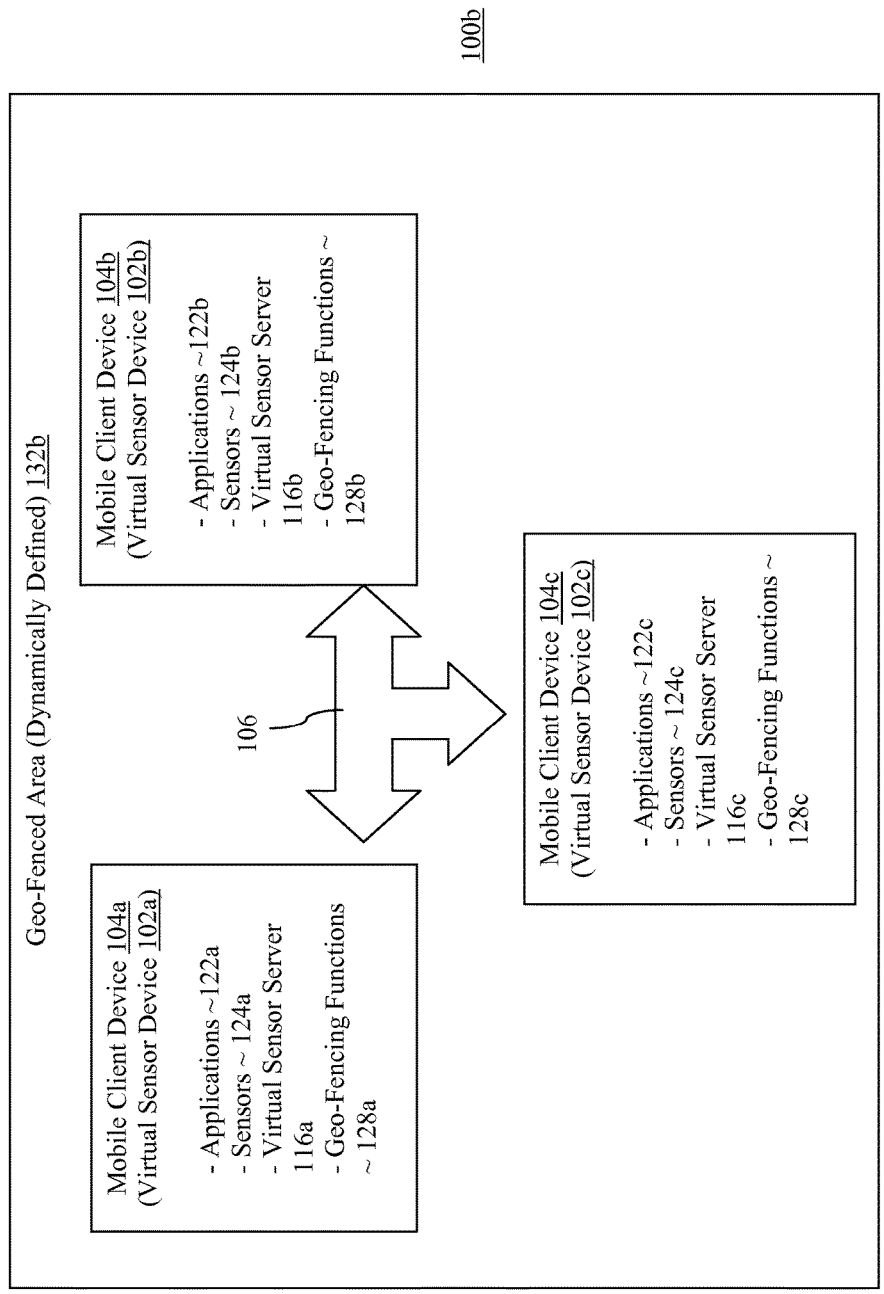
FIG. 2 illustrates one particular example operating environment of FIG. 1, according to the disclosed embodiments

Still referring to FIG. 1, and additionally to FIG. 2, in embodiments, virtual sensor device 102, as described earlier, may itself, be a mobile client device 104. Accordingly, such virtual sensor device 102 may further include applications 122, and geo-fencing server 118 may be analogous to geo-fencing functions 128. For these embodiments, as shown in FIG. 2, mobile client devices 104a-104c of operating environment 100b, more specifically, geo-fencing functions 128a-128c of mobile client devices 104a-104c may jointly and dynamically negotiate the definition of geo-fenced area 132b, that is the operational proximity of mobile client devices 104a-104c within which sensors 124a-124c are to be virtualized. An example of such geo-fenced area 132b may include, but is not limited to, an area where a group of runners (equipped with mobile client devices 104a-104c) will run together. Further, virtual sensor server 116a-116c may jointly negotiate with each other, on which one among virtual sensor server 116a-116c is to provide virtual sensor service to the other mobile client devices 104a-104c (superseding provision of sensor data to applications 122a-122c by sensors 124a-124c). In embodiments, the negotiation and selection of one of virtual sensor server 116a-116c to provide virtual sensor service to the other mobile client devices 104a-104c may be based at least in part on sensitivity of sensors 124a-124c, or battery life of mobile client devices 104a-104c. While for ease of understanding, each mobile client device 104a, 104b and 104c is illustrated as having virtual sensor server 116a, 116b and 116c correspondingly, in practice, not all mobile client devices 104a-104c have to have virtual sensor server 116a-116c. The present disclosure may be practiced with only a subset of mobile client devices 104a-104c having virtual sensor server 116a-116c. For these embodiments, negotiation and selection of the virtual sensor server 116 may be conducted among those mobile client devices 104a-104c equipped with virtual sensor servers 116a-116c.

Figure 3:
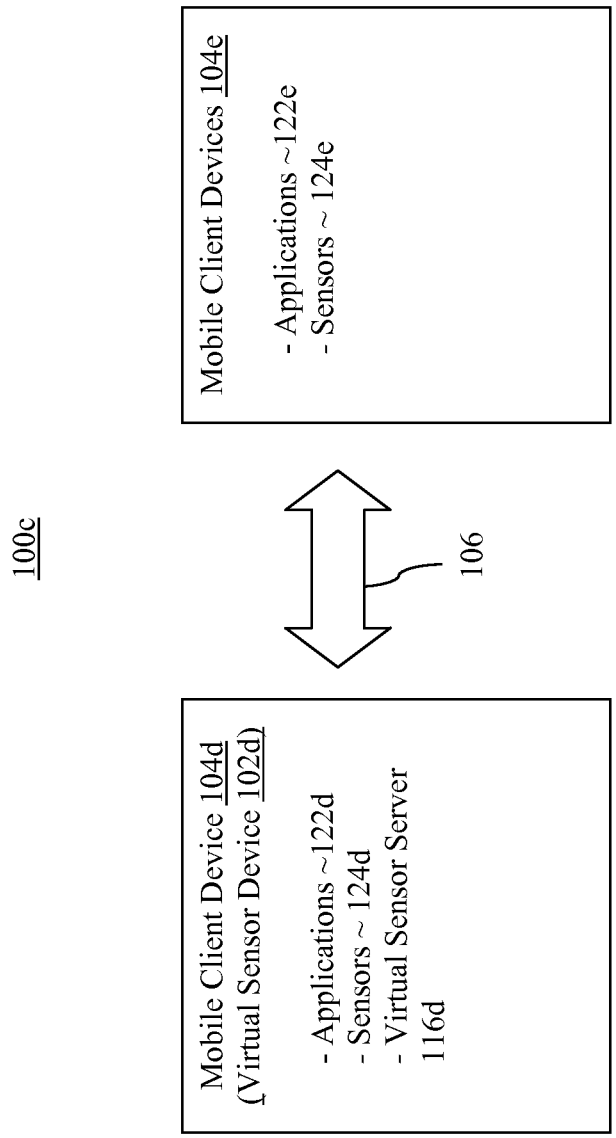
FIG. 3 illustrates another particular example operating environment of FIG. 1, according to the disclosed embodiments.

Still referring to FIG. 1, and additionally to FIG. 3, in embodiments, virtual sensor device 102d, in addition to itself being a mobile client device 104d, may provide virtual sensor service to mobile client device 104e, without reference to a geo-fenced area. For these embodiments, as described earlier, mobile client devices 104d-104e, may be configured with applications 122d-122e and sensors 124d-124e. Additionally, mobile client device 104d may be configured with virtual sensor server 116d. However, neither mobile client devices 104d-104e need to be configured with geo-fencing server/function 118 and 128. For these embodiments, a user of one of applications 122e that uses sensor data of sensors 124e, may request mobile client device 104d to become virtual sensor device 102d and provide virtualization of sensors 124e, while mobile client devices 104d-104e are in communication with each other. On receipt of the request (and optionally, on authentication of mobile client device 104e), virtual sensor server 116d may provide sensor data of sensors 124d to supersede and virtualize sensors 124e. Further, as described earlier, virtual sensor server 116d may provide configuration or operational policies for sensors 124e, while virtual sensor service is provided. For example, mobile client device 104d may have a more experienced user of a particular application, thus mobile client device 104e may request mobile client device 104d to become virtual sensor device 102d, with virtual sensor server 116d operates to provide sensor data of sensors 124d to mobile client device 102e, virtualizing and superseding sensors 124e, while the two devices 124d-124e are in near field communication proximity with each other. Mobile client device 104d might provide a configuration or operational policy to mobile client device 104e to place sensors 124e in a reduced power operational state, a low power standby/idle state or a powered off/shut down state. In embodiments, if mobile client device 104e is also equipped with virtual sensor server (not shown), mobile client device 104d and 104e may reverse roles at a different point in time, that is, with mobile client device 104e acting as a virtual sensor device, providing virtual sensor service to mobile client device 104d, virtualizing and superseding sensors 124d, instead. The role switching may be repeated any number of times, with one of mobile client devices 104d and 104e providing virtual sensor service to the other.

Figure 4:
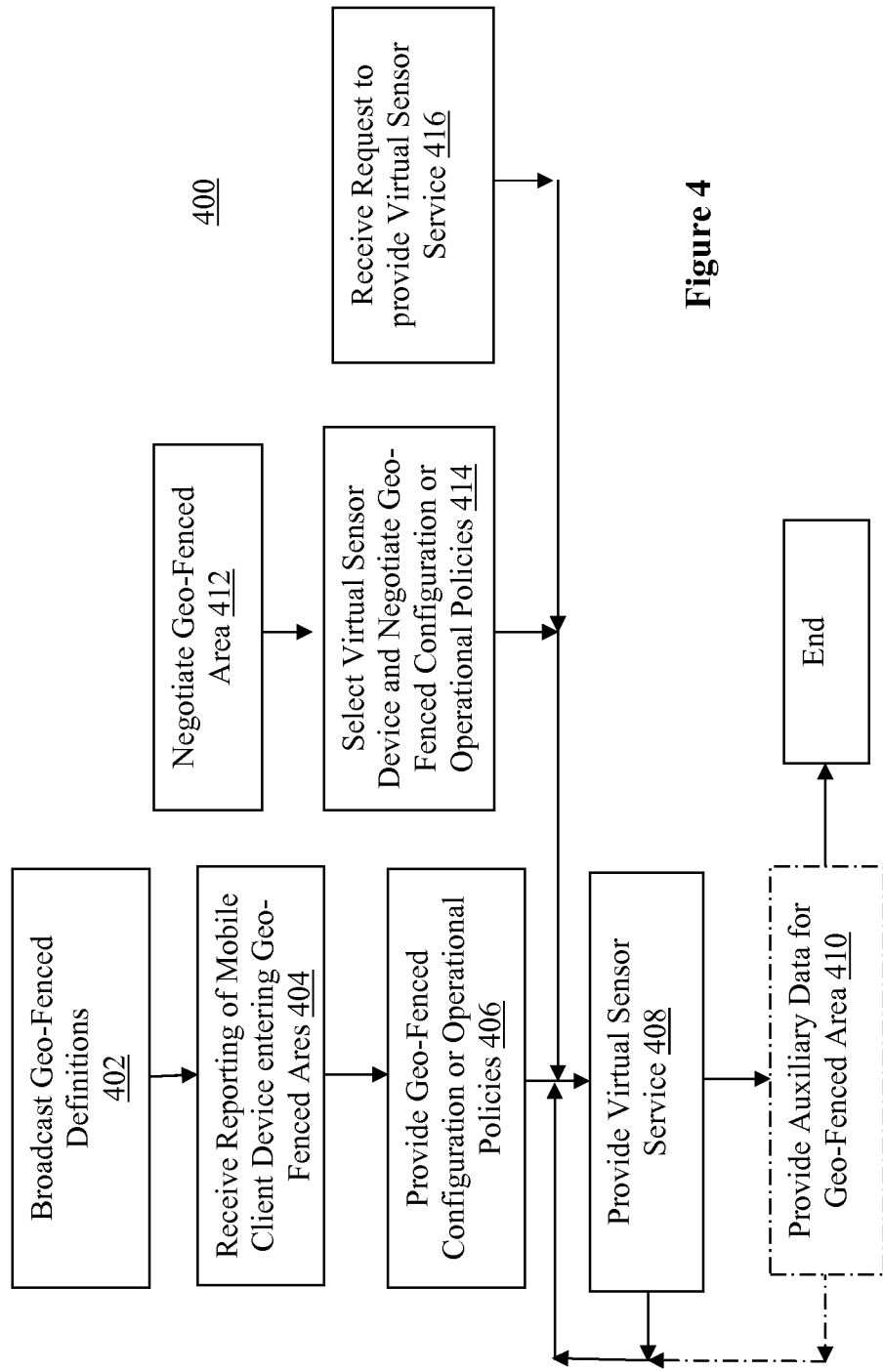
FIG. 4 is a flow diagram illustrating a process for providing virtual sensor service, according to the disclosed embodiments.

Referring now to FIG. 4, wherein an example process for providing virtual sensor service, in accordance with various embodiments, is shown. As illustrated, in embodiments, process 400 for providing virtual sensor service may include operations performed at blocks 402-416 (some of which may be optional). The operations may be performed by, e.g., earlier described virtual sensor server 116, and/or geo-fencing server 118 of virtual sensor device 102 of FIG. 1 to provide virtual sensor service to mobile client devices 104.

As shown, process 400 may start at block 402, block 412 or block 416.

At block 402, definitions of a geo-fenced area may be broadcast. Next at block 404, reporting of presence of mobile client devices within the geo-fenced area, in response to the broadcast, may be received. Then, at block 406, configuration and/or operational policies to govern the sensors of the mobile client devices entered the geo-fenced area, may be provided to the mobile client devices. From block 406, process 400 may proceed to block 408.

At block 408, virtual sensor service may be provided. As described earlier, virtual sensor service may include provision of sensor data to the mobile client devices, or reporting of sensors data to external recipients on behalf of the mobile client devices, virtualizing and superseding the sensors on the mobile client devices. From block 408, process 400 may optionally proceed to block 410 or directly to end (skipping block 410). If proceeded to block 410, at block 410, auxiliary data for the geo-fenced area may be provided to the mobile client devices entered the geo-fenced area. The operations of blocks 408 and 410 may be repeated for as long as necessary to provide the virtual sensor service to the mobile client devices, while the mobile client devices are within the geo-fenced area.

Continuing to FIG. 4, as noted earlier, process 400 may also start at block 412 instead. At block 412, instead of being broadcast, the definition of a geo-fenced area may be negotiated among a number of mobile client devices. Next, at block 414, selection of a virtual sensor device, as well as configuration and operational policies to govern the sensors may be negotiated among the mobile client devices. On completion of the negotiations, process 400 may proceed to block 408, and proceed therefrom as earlier described.

Still referring to FIG. 4, as noted earlier, process 400 may also start at block 416 instead. At block 416, a request to provide virtual sensor service may be received. On receipt (and optional authentication of the requesting device (not shown)), process 400 may proceed to block 408, and proceed therefrom as earlier described, with the device accepting the request to act as a virtual sensor device providing virtual sensor service to the requesting device.

Figure 5:
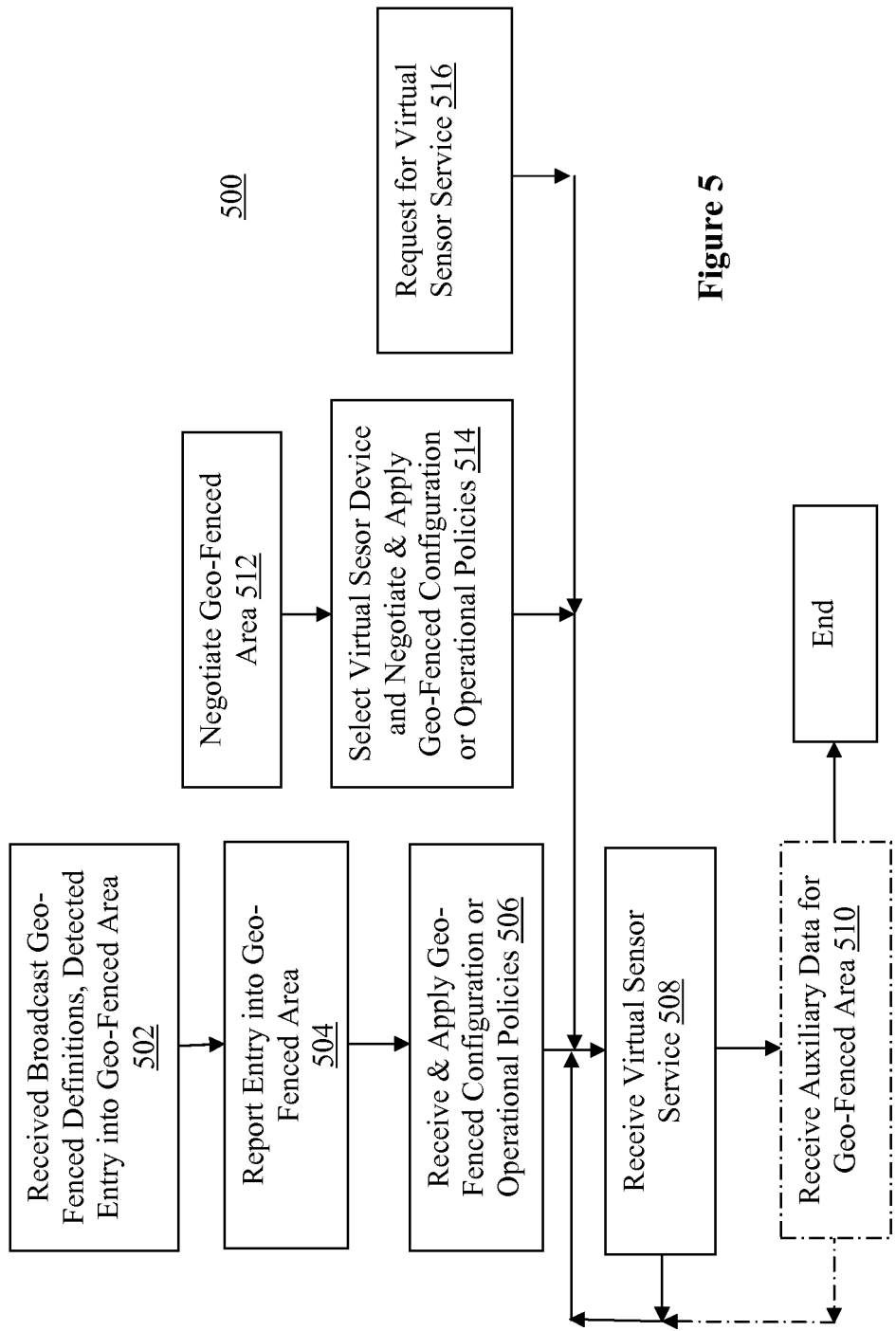
FIG. 5 is a flow diagram illustrating a process for receiving virtual sensor service, according to the disclosed embodiments.

Referring now to FIG. 5, wherein an example process for receiving virtual sensor service, in accordance with various embodiments, is shown. As illustrated, in embodiments, process 500 for receiving virtual sensor service may include operations performed at blocks 502-516 (some of which may be optional). The operations may be performed by, e.g., application 122 and/or geo-fencing function 128 of mobile client device 104 of FIG. 1 to receive virtual sensor service.

As shown, process 500 may start at block 502, block 512 or block 516.

At block 502, broadcast definitions of a geo-fenced area may be received. On receipt, a determination may be made to detect whether the recipient is within the geo-fenced area. Next at block 504, on determination that the recipient is within the geo-fenced area, presence of the recipient within the geo-fenced area may be reported to the broadcaster. Then, at block 506, configuration and/or operational policies to govern the sensors of the recipient, while the recipient is within the geo-fenced area, may be received and applied. From block 506, process 500 may proceed to block 508.

At block 508, virtual sensor service may be received (consumed). As described earlier, virtual sensor service may include receipt of sensor data from the virtual sensor device, or allowing sensors data of the virtual sensor device to be reported to external recipients on behalf of the receiver of the service, superseding the sensors on the receiver of the service. From block 508, process 500 may optionally proceed to block 510 or directly to end (skipping block 510). If proceeded to block 510, at block 510, auxiliary data for the geo-fenced area may be received by the receiver of the service, from the virtual sensor device. The operations at blocks 508 and 510 may be repeated a number of times, as long as necessary, to receive virtual sensor service.

Continuing to FIG. 5, as noted earlier, process 500 may also start at block 512 instead. At block 512, the definition of a geo-fenced area may be negotiated among a number of potential service recipients. Next, at block 514, selection of a virtual sensor device, as well as configuration and operational policies to govern the sensors of the service recipients may be negotiated among the potential service providers and/or recipients. On completion of the negotiations, process 500 may proceed to block 508, and proceed therefrom as earlier described, with the selected device acting as the virtual sensor device providing virtual sensor services to the other devices.

Still referring to FIG. 5, as noted earlier, process 500 may also start at block 516 instead. At block 516, a request for virtual sensor service may be sent by a potential service recipient to a virtual sensor device. On transmission (and optional authentication of the requesting device (not shown)), process 500 may proceed to block 508, and proceed therefrom as earlier described, with the device making the request receiving virtual sensor service from the device accepting the request, acting as the virtual sensor device.

Figure 6:
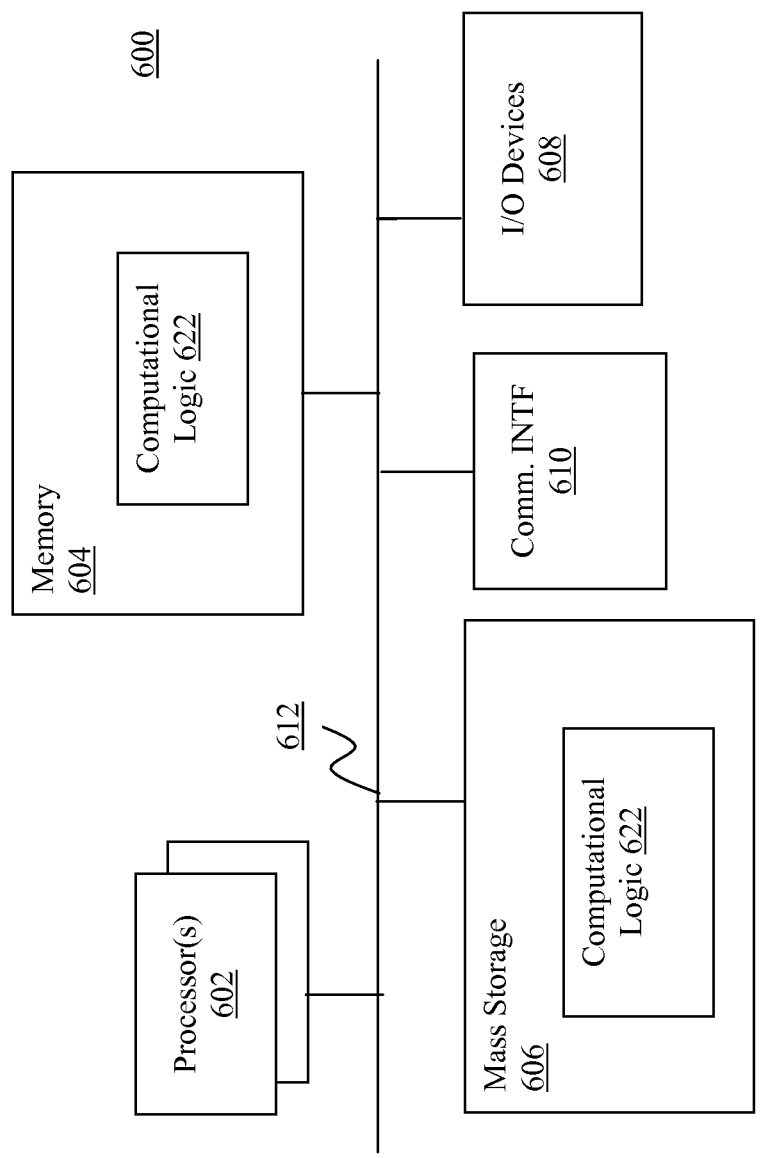
FIG. 6 illustrates an example computer system suitable for use to practice various aspects of the present disclosure, according to the disclosed embodiments.

FIG. 6 illustrates an example computer system that may be suitable for use as a client device or a server to practice selected aspects of the present disclosure. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control and so forth) and communication interfaces 610 (such as network interface cards, modems and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with virtual sensor server 116, and/or geo-fencing server/function 118/128 of FIG. 1, earlier described, collectively referred to as computational logic 622. The various elements may be implemented by assembler instructions supported by processor(s) 602 or high-level languages, such as, for example, C, that can be compiled into such instructions.

The number, capability and/or capacity of these elements 610-612 may vary, depending on whether computer 600 is used as a client device or a server, as well as whether computer 600 is stationary or mobile. For example, for a client device, the capability and/or capacity of these elements 610-612 may vary, depending on whether the client device is a stationary or mobile device, like a wearable computing device, a smartphone, a computing tablet, an ultrabook or a laptop. Otherwise, the constitutions of elements 610-612 are known, and accordingly will not be further described.

Figure 7:
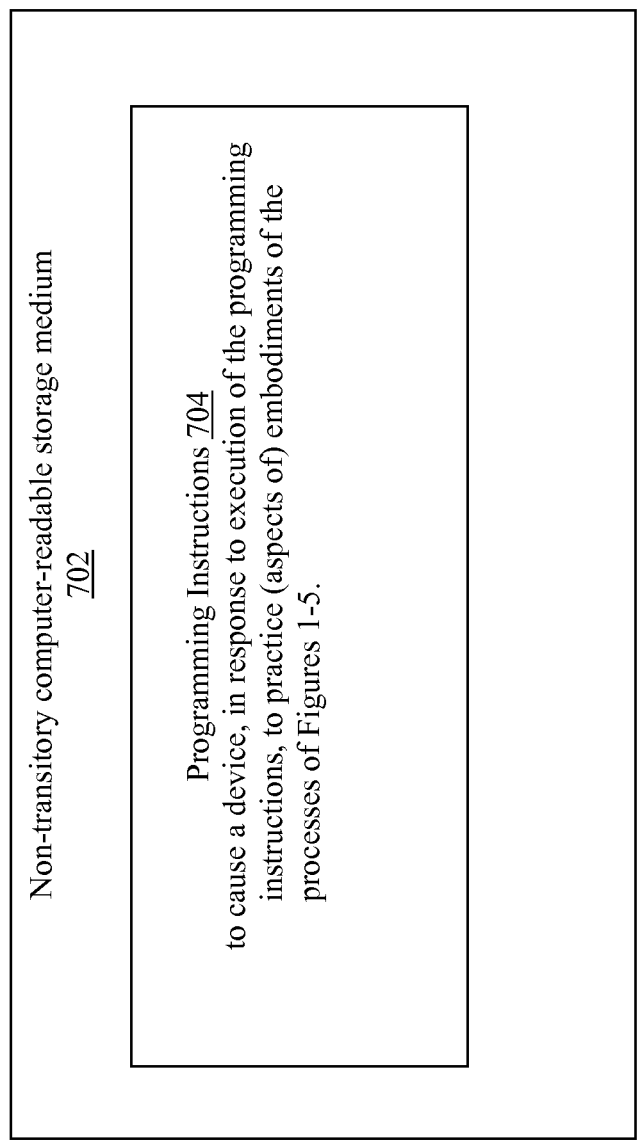
FIG. 7 illustrates a storage medium having instructions for practicing methods described with references to FIGS. 1-5, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., computer 600, in response to execution of the programming instructions, to perform, e.g., various operations associated with virtual sensor server 116, and/or geo-fencing server/function 118/128 of FIG. 1. In alternate embodiments, programming instructions 704 may be disposed on multiple computer-readable non-transitory storage media 702 instead. In alternate embodiments, programming instructions 704 may be disposed on computer-readable transitory storage media 702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 6, for one embodiment, at least one of processors 602 may be packaged together with memory having computational logic 622 (in lieu of storing on memory 604 and storage 606). For one embodiment, at least one of processors 602 may be packaged together with memory having computational logic 622 to form a System in Package (SiP). For one embodiment, at least one of processors 602 may be integrated on the same die with memory having computational logic 622. For one embodiment, at least one of processors 602 may be packaged together with memory having computational logic 622 to form a System on Chip (SoC). For at least one embodiment, the SoC may be utilized in, e.g., but not limited to, a wearing computing device, a smartphone or computing tablet.

Thus various example embodiments of the present disclosure have been described including, but are not limited to:

Example 1 may be an apparatus for computing. The apparatus may comprise one or more processors, and a virtual sensor server. The virtual sensor server may be operated by the one or more processors, to provide virtual sensor service to one or more mobile client devices to virtualize one or more sensors of each of the one or more mobile client devices. In particular, the virtual sensor server may be operated to provide sensor data to each of the one or more mobile client devices, or to report sensor data to one or more recipients external to the one or more mobile client devices on behalf of respective one or ones of the one or more mobile client devices, superseding the corresponding sensor(s) on the respective one or more of the mobile client devices.

Example 2 may be example 1, wherein the one or more sensors of each of the one or more mobile client devices may comprise a global positioning system (GPS) sensor, and wherein the virtual sensor server may be operated to provide location data to each of the one or more mobile client devices, or to report current location to the one or more external recipients on behalf of each of the one or more mobile client devices, superseding the GPS sensor on the respective one or more of the mobile client devices.

Example 3 may be example 1 or 2, wherein the virtual sensor service may include provision to the one or more mobile client devices, one or more configuration or operational policies for the one or more sensors on the one or more mobile client devices.

Example 4 may be example 3, wherein the one or more configuration or operational policies may comprise one or more configuration or operational policies for the one or more sensors on the one or more mobile client devices, while the one or more mobile client devices are in a geo-fenced area.

Example 5 may be example 4, further comprising a geo-fencing server to be operated by the one or more processors to provide geo-fencing service that includes cooperation with the virtual sensor server to provide to corresponding geo-fencing function(s) of the one or more mobile client devices, the one or more geo-fencing configuration or operational policies for the one or more sensors on the one or more mobile client devices.

Example 6 may be example 5, wherein the geo-fencing server may be operated to cooperate with the virtual sensor server to provide the one or more geo-fencing configuration or operational policies for the one or more sensors on the one or more mobile client devices, in response to the geo-fencing server in receipt of reporting of presence within the geo-fenced area by the one or more mobile client devices.

Example 7 may be example 5 or 6, wherein the geo-fencing server may be operated to broadcast notifications of the geo-fenced area.

Example 8 may be any one of examples 4-7, wherein the virtual sensor server may be operated to further provide auxiliary information about the geo-fenced area.

Example 9 may be any one of examples 1-8, wherein the apparatus may comprise an infrastructure server or a home appliance.

Example 10 may be example 1, wherein the apparatus may be a mobile client device having the one or more sensors, and wherein the virtual sensor server may be operated to negotiate with the other one or more mobile client devices, on one or more configuration or operational policies that govern the one or more sensors of the mobile client devices, while the mobile client devices are in a geo-fenced area.

Example 11 may be example 10, wherein the virtual sensor server may be operated to negotiate the one or more configuration or operational policies, based at least in part on sensitivity or range of the one or more sensors, or battery life of the mobile client devices.

Example 12 may be example 10, further comprising a geo-fencing function to be operated by the one or more processors to provide geo-fencing service, including cooperation with geo-fencing function(s) of the other one or more mobile client device to define the geo-fenced area.

Example 13 may be any one of examples 10-12, wherein the one or more sensors of each of the one or more mobile client devices may comprise an accelerometer sensor or a gyroscope sensor, and wherein the virtual sensor server is to provide accelerometer or gyroscope sensor data to each of the one or more mobile client devices, superseding the accelerometer or gyroscope sensor on the respective one or more of the mobile client devices.

Example 14 may be a mobile client device for computing, having one or more processors, one or more sensors; and an application or a geo-fencing function. The application or a geo-fencing function may be operated by the one or more processors, to apply a configuration or operation policy to the one or more sensors, and receive virtual sensor service from a virtual sensor device, external to the mobile client device, to virtualize and supersede the one or more sensors of the mobile client device.

Example 15 may be example 14, wherein the one or more sensors may comprise a global positioning system (GPS) sensor, and wherein the application or a geo-fencing function may be operated to receive location data from the virtual sensor device, or have current location of the mobile client device reported to one or more external recipients, by the virtual sensor device, on behalf of mobile client device, superseding the GPS sensor on the mobile client device.

Example 16 may be example 14 or 15, wherein the application or geo-fencing function may be operated to receive the one or more configuration or operational policies for the one or more sensors from the virtual sensor device.

Example 17 may be example 16, wherein the one or more configuration or operational policies may comprise one or more configuration or operational policies for the one or more sensors, while the mobile client device is in a geo-fenced area.

Example 18 may be example 17, wherein the geo-fencing function may be operated to report presence of the mobile client device within the geo-fenced area, to the virtual sensor device.

Example 19 may be example 17 or 18, wherein the geo-fencing function may be operated to receive notifications of the geo-fenced area broadcast by the virtual sensor device.

Example 20 may be any one of examples 17-19, wherein the geo-fencing function may be operated to further receive auxiliary information about the geo-fenced area from the virtual sensor device.

Example 21 may be example 14, wherein the virtual sensor device is another mobile client device having one or more sensors, and wherein the geo-fencing function is to negotiate the one or more configuration or operational policies for a geo-fenced area, with the other mobile client.

Example 22 may be example 21, wherein the geo-fencing function may be operated to negotiate the one or more configuration or operational policies, based at least in part on sensitivity or range of the one or more sensors, or battery life of the mobile client devices.

Example 23 may be example 21, wherein the geo-fencing function may be operated to further cooperate with a corresponding geo-fencing function of the other mobile client device to define the geo-fenced area.

Example 24 may be any one of examples 21-23, wherein the one or more sensors may comprise an accelerometer sensor or a gyroscope sensor, and wherein the application or geo-fencing function may be operated to receive from the virtual sensor device, accelerometer or gyroscope sensor data, superseding the accelerometer or gyroscope sensor on the mobile client device.

Example 25 may be a method for computing. The method may comprise establishing, by a virtual sensor device, a service provider-service consumer relationship with a mobile client device for providing virtual sensor service to the mobile client device; and providing, by the virtual sensor device, virtual sensor service to the mobile client device to virtualize one or more sensors of the mobile client device. The providing may comprise providing sensor data to the mobile client device, or reporting sensor data to one or more recipients external to the mobile client device on behalf of the mobile client device, superseding the corresponding sensor(s) on the mobile client device.

Example 26 may be example 25, wherein the one or more sensors of each of the one or more mobile client devices may comprise a global positioning system (GPS) sensor, and wherein providing may comprise providing location data to each of the one or more mobile client devices, or reporting current location to the one or more external recipients on behalf of each of the one or more mobile client devices, superseding the GPS sensors on the respective one or more of the mobile client devices.

Example 27 may be example 26, wherein providing may comprise providing to the one or more mobile client devices, one or more configuration or operational policies for the one or more sensors on the one or more mobile client devices.

Example 28 may be example 27, wherein the one or more configuration or operational policies may comprise one or more configuration or operational policies for the one or more sensors on the one or more mobile client devices, while the one or more mobile client devices are in a geo-fenced area.

Example 29 may be example 28, further comprising providing, by a geo-fencing function of the virtual sensor device, to the one or more mobile client devices, the one or more geo-fencing configuration or operational policies for the one or more sensors on the one or more mobile client devices.

Example 30 may be example 29, wherein providing may comprise providing to the one or more mobile client devices, the one or more geo-fencing configuration or operational policies for the one or more sensors on the one or more mobile client devices, in response to receipt of reporting of presence within the geo-fenced area from the one or more mobile client devices.

Example 31 may be example 29 or 30, further comprising broadcasting, by the virtual sensor device, notifications of the geo-fenced area.

Example 32 may be any one of examples 28-31, further comprising providing, by the virtual sensor device, auxiliary information about the geo-fenced area.

Example 33 may be any one of the examples 25-32, wherein the establishing and providing may be performed by an infrastructure server or a home appliance.

Example 34 may be example 25, wherein the virtual sensor device may be a mobile client device having the one or more sensors, and wherein the method may further comprise negotiating among the mobile client devices, one or more configuration or operational policies that govern the one or more sensors of the mobile client devices, while the mobile client devices are in a geo-fenced area.

Example 35 may be example 34, wherein negotiating may comprise negotiating the one or more configuration or operational policies, based at least in part on sensitivity or range of the one or more sensors, or battery life of the mobile client devices.

Example 36 may be example 34, wherein negotiating may comprise negotiating a definition of the geo-fenced area.

Example 37 may be any one of examples 34-36, wherein the one or more sensors of each of the one or more mobile client devices may comprise an accelerometer sensor or a gyroscope sensor, and providing may comprise providing accelerometer or gyroscope sensor data to each of the one or more mobile client devices, superseding the accelerometer or gyroscope sensor on the respective one or more of the mobile client devices.

Example 38 may be a method for computing, comprising: applying, by a mobile client device, a configuration or operation policy to operation of one or more sensors; and receiving, by the mobile client device, virtual sensor service from a virtual sensor device, external to the mobile client device, to virtualize and supersede the one or more sensors of the mobile client device.

Example 39 may be example 38, wherein the one or more sensors may comprise a global positioning system (GPS) sensor, and wherein receiving may comprise receiving location data from the virtual sensor device, or have current location of the mobile client device reported to one or more external recipients, by the virtual sensor device, on behalf of mobile client device, superseding the GPS sensor on the mobile client device.

Example 40 may be example 38, further comprising receiving, by the mobile client device, the one or more configuration or operational policies for the one or more sensors from the virtual sensor device.

Example 41 may be example 40, wherein the one or more configuration or operational policies may comprise one or more configuration or operational policies for the one or more sensors, while the mobile client device is in a geo-fenced area.

Example 42 may be example 41, further comprising reporting presence within the geo-fenced area by the mobile client device, to the virtual sensor device.

Example 43 may be example 41 or 42, further comprising receiving, by the mobile client device, notifications of the geo-fenced area broadcast by the virtual sensor device.

Example 44 may be any one of examples 41-43, further comprising receiving auxiliary information about the geo-fenced area from the virtual sensor device.

Example 45 may be example 28, wherein the virtual sensor device may be another mobile client device having one or more sensors, and wherein the method may further comprise negotiating, by the mobile client device, the one or more configuration or operational policies for a geo-fenced area, with the other mobile client.

Example 46 may be example 45, wherein negotiating may comprise negotiating the one or more configuration or operational policies, based at least in part on sensitivity or range of the one or more sensors, or battery life of the mobile client devices.

Example 47 may be example 45, further comprising the mobile client devices jointly defining the geo-fenced area.

Example 48 may be any one of claims 45-47, wherein the one or more sensors may comprise an accelerometer sensor or a gyroscope sensor, and wherein receiving may comprise receiving from the virtual sensor device, accelerometer or gyroscope sensor data, superseding the accelerometer or gyroscope sensor on the mobile client device.

Example 49 may be one or more computer-readable medium having stored therein a plurality of instructions to cause an apparatus, in response to execution of the instructions by the apparatus to operate a virtual sensor server to provide virtual sensor service to one or more mobile client devices to virtualize one or more sensors of each of the one or more mobile client devices. The virtual sensor server may provide sensor data to each of the one or more mobile client devices, or report sensor data to one or more recipients external to the one or more mobile client devices on behalf of respective one or ones of the one or more mobile client devices, superseding the corresponding sensor(s) on the respective one or more of the mobile client devices.

Example 50 may be example 49, wherein the one or more sensors of each of the one or more mobile client devices may comprise a global positioning system (GPS) sensor, and wherein the virtual sensor server may provide location data to each of the one or more mobile client devices, or report current location to the one or more external recipients on behalf of each of the one or more mobile client devices, superseding the GPS sensor on the respective one or more of the mobile client devices.

Example 51 may be example 49 or 50, wherein the virtual sensor service may include provision to the one or more mobile client devices, one or more configuration or operational policies for the one or more sensors on the one or more mobile client devices.

Example 52 may be example 51, wherein the one or more configuration or operational policies may comprise one or more configuration or operational policies for the one or more sensors on the one or more mobile client devices, while the one or more mobile client devices are in a geo-fenced area.

Example 53 may be example 52, wherein the apparatus may be further caused to operate a geo-fencing server to provide geo-fencing service that includes cooperation with the virtual sensor server to provide to corresponding geo-fencing function(s) of the one or more mobile client devices, the one or more geo-fencing configuration or operational policies for the one or more sensors on the one or more mobile client devices.

Example 54 may be example 53, wherein the geo-fencing server is to cooperate with the virtual sensor server to provide the one or more geo-fencing configuration or operational policies for the one or more sensors on the one or more mobile client devices, in response to the geo-fencing server in receipt of reporting of presence within the geo-fenced area by the one or more mobile client devices.

Example 55 may be example 53 or 54, wherein the geo-fencing server may broadcast notifications of the geo-fenced area.

Example 56 may be any one of examples 52-55, wherein the virtual sensor server may further provide auxiliary information about the geo-fenced area.

Example 57 may be any one of the examples 49-56, wherein the apparatus may comprise an infrastructure server or a home appliance.

Example 58 may be example 49, wherein the apparatus may be a mobile client device having the one or more sensors, and wherein the virtual sensor server may negotiate with the other one or more mobile client devices, on one or more configuration or operational policies that govern the one or more sensors of the mobile client devices, while the mobile client devices are in a geo-fenced area.

Example 59 may be example 58, wherein the virtual sensor server may negotiate the one or more configuration or operational policies, based at least in part on sensitivity or range of the one or more sensors, or battery life of the mobile client devices.

Example 60 may be example 58 or 59, further comprising a geo-fencing function to provide geo-fencing service, including cooperation with geo-fencing function(s) of the other one or more mobile client device to define the geo-fenced area.

Example 61 may be any one of examples 58-60, wherein the one or more sensors of each of the one or more mobile client devices may comprise an accelerometer sensor or a gyroscope sensor, and wherein the virtual sensor server may provide accelerometer or gyroscope sensor data to each of the one or more mobile client devices, superseding the accelerometer or gyroscope sensor on the respective one or more of the mobile client devices.

Example 62 may be one or more computer-readable medium having stored therein a plurality of instructions to cause a mobile client device having one or more sensors, in response to execution of the instructions by the mobile client device to operate an application or a geo-fencing function, to apply a configuration or operation policy to the one or more sensors, and receive virtual sensor service from a virtual sensor device, external to the mobile client device, to virtualize and supersede the one or more sensors of the mobile client device.

Example 63 may be example 62, wherein the one or more sensors may comprise a global positioning system (GPS) sensor, and wherein the application or a geo-fencing function may receive location data from the virtual sensor device, or have current location of the mobile client device reported to one or more external recipients, by the virtual sensor device, on behalf of mobile client device, superseding the GPS sensor on the mobile client device.

Example 64 may be example 62 or 63, wherein the application or geo-fencing function may receive the one or more configuration or operational policies for the one or more sensors from the virtual sensor device.

Example 65 may be example 64, wherein the one or more configuration or operational policies may comprise one or more configuration or operational policies for the one or more sensors, while the mobile client device is in a geo-fenced area.

Example 66 may be example 65, wherein the geo-fencing function may further report presence of the mobile client device within the geo-fenced area, to the virtual sensor device.

Example 67 may be example 65 or 66, wherein the geo-fencing function may receive notifications of the geo-fenced area broadcast by the virtual sensor device.

Example 68 may be any one of examples 65-67, wherein the geo-fencing function may further receive auxiliary information about the geo-fenced area from the virtual sensor device.

Example 69 may be example 62, wherein the virtual sensor device may be another mobile client device having one or more sensors, and wherein the geo-fencing function may negotiate the one or more configuration or operational policies for a geo-fenced area, with the other mobile client.

Example 70 may be example 69, wherein the geo-fencing function may negotiate the one or more configuration or operational policies, based at least in part on sensitivity or range of the one or more sensors, or battery life of the mobile client devices.

Example 70 may be example 69 or 70, wherein the geo-fencing function may further cooperate with a corresponding geo-fencing function of the other mobile client device to define the geo-fenced area.

Example 72 may be any one of examples 69-71, wherein the one or more sensors comprise an accelerometer sensor or a gyroscope sensor, and wherein the application or geo-fencing function is to receive from the virtual sensor device, accelerometer or gyroscope sensor data, superseding the accelerometer or gyroscope sensor on the mobile client device.

Example 73 may be an apparatus for computing, comprising: virtual sensor server means for providing virtual sensor service to one or more mobile client devices to virtualize one or more sensors of each of the one or more mobile client devices. The virtual sensor server means may comprise means for providing sensor data to each of the one or more mobile client devices, or means for reporting sensor data to one or more recipients external to the one or more mobile client devices on behalf of respective one or ones of the one or more mobile client devices, wherein the provision or the reporting supersedes the corresponding sensor(s) on the respective one or more of the mobile client devices.

Example 74 may be example 73, wherein the one or more sensors of each of the one or more mobile client devices may comprise a global positioning system (GPS) sensor, and wherein the virtual sensor server means may comprise means for providing location data to each of the one or more mobile client devices, or means for reporting current location to the one or more external recipients on behalf of each of the one or more mobile client devices, wherein the provision or the reporting supersedes the GPS sensor on the respective one or more of the mobile client devices.

Example 75 may be example 73 or 74, wherein the virtual sensor service may include provision to the one or more mobile client devices, one or more configuration or operational policies for the one or more sensors on the one or more mobile client devices.

Example 76 may be example 75, wherein the one or more configuration or operational policies may comprise one or more configuration or operational policies for the one or more sensors on the one or more mobile client devices, while the one or more mobile client devices are in a geo-fenced area.

Example 77 may be example 76, further comprising geo-fencing server means for providing geo-fencing service that includes cooperation with the virtual sensor server means to provide to corresponding geo-fencing function(s) of the one or more mobile client devices, the one or more geo-fencing configuration or operational policies for the one or more sensors on the one or more mobile client devices.

Example 78 may be example 77, wherein the geo-fencing server means may comprise means for cooperating with the virtual sensor server means to provide the one or more geo-fencing configuration or operational policies for the one or more sensors on the one or more mobile client devices, in response to the geo-fencing server means receiving reporting of presence within the geo-fenced area by the one or more mobile client devices.

Example 79 may be example 77 or 78, wherein the geo-fencing server means may comprise means for broadcasting notifications of the geo-fenced area.

Example 80 may be any one of examples 76-79, wherein the virtual sensor server means may comprise means for providing auxiliary information about the geo-fenced area.

Example 81 may be any one of the examples 73-80, wherein the apparatus may comprise an infrastructure server or a home appliance.

Example 82 may be example 73, wherein the apparatus may be a mobile client device having the one or more sensors, and wherein the virtual sensor server means may comprise means for negotiating with the other one or more mobile client devices, on one or more configuration or operational policies that govern the one or more sensors of the mobile client devices, while the mobile client devices are in a geo-fenced area.

Example 83 may be example 82, wherein the virtual sensor server means may comprise means for negotiating the one or more configuration or operational policies, based at least in part on sensitivity or range of the one or more sensors, or battery life of the mobile client devices.

Example 84 may be example 82 or 83, further comprising geo-fencing function means for providing geo-fencing service, including cooperation with geo-fencing function(s) of the other one or more mobile client device to define the geo-fenced area.

Example 85 may be any one of examples 82-84, wherein the one or more sensors of each of the one or more mobile client devices comprise an accelerometer sensor or a gyroscope sensor, and wherein the virtual sensor server means may comprise means for providing accelerometer or gyroscope sensor data to each of the one or more mobile client devices, wherein the provision supersedes the accelerometer or gyroscope sensor on the respective one or more of the mobile client devices.

Example 86 may be a mobile client device for computing, comprising: an application or a geo-fencing function means for applying a configuration or operation policy to the one or more sensors. The application or a geo-fencing function means may includes means for receiving virtual sensor service from a virtual sensor device, external to the mobile client device, to virtualize and supersede the one or more sensors of the mobile client device.

Example 87 may be example 86, wherein the one or more sensors may comprise a global positioning system (GPS) sensor, and wherein the application or a geo-fencing function means may comprise means for receiving location data from the virtual sensor device, or have current location of the mobile client device reported to one or more external recipients, by the virtual sensor device, on behalf of mobile client device, wherein the provision or the reporting supersedes the GPS sensor on the mobile client device.

Example 88 may be example 86 or 87, wherein the application or geo-fencing function means may comprise means for receiving the one or more configuration or operational policies for the one or more sensors from the virtual sensor device.

Example 89 may be example 88, wherein the one or more configuration or operational policies may comprise one or more configuration or operational policies for the one or more sensors, while the mobile client device is in a geo-fenced area.

Example 90 may be example 89, wherein the geo-fencing function means may comprise means for reporting presence of the mobile client device within the geo-fenced area by the mobile client device, to the virtual sensor device.

Example 91 may be example 89 or 90, wherein the geo-fencing function means may comprise means for receiving notifications of the geo-fenced area broadcast by the virtual sensor device.

Example 92 may be example 91, wherein the geo-fencing function may comprise means for receiving auxiliary information about the geo-fenced area from the virtual sensor device.

Example 93 may be example 86, wherein the virtual sensor device may be another mobile client device having one or more sensors, and wherein the geo-fencing function means may comprise means for negotiating the one or more configuration or operational policies for a geo-fenced area, with the other mobile client.

Example 94 may be example 93, wherein the geo-fencing function means may comprise means for negotiating the one or more configuration or operational policies, based at least in part on sensitivity or range of the one or more sensors, or battery life of the mobile client devices.

Example 95 may be example 93 or 94, wherein the geo-fencing function means may comprise means for cooperating with a corresponding geo-fencing function of the other mobile client device to define the geo-fenced area.

Example 96 may be example any one of claims 93-95, wherein the one or more sensors may comprise an accelerometer sensor or a gyroscope sensor, and wherein the application or geo-fencing function means may comprise means for receiving from the virtual sensor device, accelerometer or gyroscope sensor data, wherein the receipt supersedes the accelerometer or gyroscope sensor on the mobile client device.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing in association with one or more mobile client devices, comprising:
   one or more processors;
   a virtual sensor server to be operated by the one or more processors, to provide virtual sensor service to the one or more mobile client devices within a geo-fenced area to virtualize one or more sensors of each of the one or more mobile client devices;

wherein:
the geo-fenced area is jointly and dynamically negotiated by the one or more mobile client devices;
the virtual sensor server is to provide sensor data to each of the one or more mobile client devices, or to report sensor data to one or more recipients external to the one or more mobile client devices on behalf of respective one or ones of the one or more mobile client devices;
the provided sensor data is to supersede the corresponding one or more sensors on the respective one or more of the mobile client devices; and
the virtual sensor server is to cause each of the one or more mobile client devices to place the corresponding one or more sensors in a reduced operational or non-operational state.

2. The apparatus of claim 1, wherein the one or more sensors of each of the one or more mobile client devices comprise a global positioning system (GPS) sensor, and wherein the virtual sensor server is to provide location data to each of the one or more mobile client devices, or to report a current location to the one or more external recipients on behalf of each of the one or more mobile client devices, superseding the GPS sensor on the respective one or more of the mobile client devices.

3. The apparatus of claim 1, wherein the virtual sensor service includes provision of the one or more mobile client devices, one or more configuration or operational policies for the one or more sensors on the one or more mobile client devices.

4. The apparatus of claim 3, wherein the one or more configuration or operational policies comprise one or more configuration or operational policies for the one or more sensors on the one or more mobile client devices, while the one or more mobile client devices are in the geo-fenced area.

5. The apparatus of claim 4, further comprising a geo-fencing server to provide geo-fencing service that includes cooperation with the virtual sensor server to provide to corresponding geo-fencing function(s) of the one or more mobile client devices, the one or more configuration or operational policies for the one or more sensors on the one or more mobile client devices.

6. The apparatus of claim 5, wherein the geo-fencing server is to cooperate with the virtual sensor server to provide the one or more configuration or operational policies for the one or more sensors on the one or more mobile client devices, in response to the geo-fencing server in receipt of reporting of presence within the geo-fenced area by the one or more mobile client devices.

7. The apparatus of claim 5, wherein the geo-fencing server is to broadcast notifications of the geo-fenced area.

8. The apparatus of claim 4, wherein the virtual sensor server is to further provide auxiliary information about the geo-fenced area.

9. The apparatus of claim 1, wherein the apparatus comprises an infrastructure server or a home appliance.

10. The apparatus of claim 1, wherein the apparatus is a mobile client device having the one or more sensors, and wherein the virtual sensor server is to negotiate with the other one or more mobile client devices, on one or more configuration or operational policies that govern the one or more sensors of the mobile client devices, while the mobile client devices are in the geo-fenced area.

11. The apparatus of claim 10, wherein the virtual sensor server is to negotiate the one or more configuration or operational policies, based at least in part on sensitivity or range of the one or more sensors, or battery life of the mobile client devices.

12. The apparatus of claim 10, further comprising a geo-fencing function to provide geo-fencing service, including cooperation with geo-fencing function(s) of the other one or more mobile client device to define the geo-fenced area.

13. The apparatus of claim 10, wherein the one or more sensors of each of the one or more mobile client devices comprise an accelerometer sensor or a gyroscope sensor, and wherein the virtual sensor server is to provide accelerometer or gyroscope sensor data to each of the one or more mobile client devices, superseding the accelerometer or gyroscope sensor on the respective one or more of the mobile client devices.

14. One or more non-transitory computer-readable medium having stored therein a plurality of instructions to cause a mobile client device having one or more sensors, in response to execution of the instructions by the mobile client device to operate a geo-fencing function, to apply one or more configuration or operational policies to the one or more sensors, and receive virtual sensor service from a virtual sensor device, external to the mobile client device;

wherein:
the virtual sensor service is to provide sensor data to supersede the one or more sensors of the mobile client device,
a geo-fenced area of the geo-fencing function is jointly and dynamically negotiated by the mobile client device with one or more other devices, and
the virtual sensor device is to cause the mobile client device to place the one or more sensors in a reduced operational or non-operational state.

15. The computer-readable medium of claim 14, wherein an application or geo-fencing function is to receive the one or more configuration or operational policies for the one or more sensors from the virtual sensor device.

16. The computer-readable medium of claim 15, wherein the one or more configuration or operational policies comprises one or more configuration or operational policies for the one or more sensors, while the mobile client device is in a geo-fenced area.

17. The computer-readable medium of claim 16, wherein the geo-fencing function is to further report presence of the mobile client device within the geo-fenced area, to the virtual sensor device.

18. The computer-readable medium of claim 16, wherein the geo-fencing function is to receive notifications of the geo-fenced area broadcast by the virtual sensor device.

19. The computer-readable medium of claim 18, wherein the geo-fencing function is to further receive auxiliary information about the geo-fenced area from the virtual sensor device.

20. The computer-readable medium of claim 14, wherein the virtual sensor device is another mobile client device having one or more sensors, and wherein the geo-fencing function is to negotiate the one or more configuration or operational policies for a geo-fenced area, with the other mobile client.

21. The computer-readable medium of claim 20, wherein the geo-fencing function is to negotiate the one or more configuration or operational policies, based at least in part on sensitivity or range of the one or more sensors, or battery life of the mobile client devices.

22. The computer-readable medium of claim 20, wherein the geo-fencing function is to further cooperate with a corresponding geo-fencing function of the other mobile client device to define the geo-fenced area.

23. A method for computing in association with a mobile client device, comprising:
- establishing, by a virtual sensor device, a service provider-service consumer relationship with the mobile client device for providing virtual sensor service to the mobile client device; and
- providing, by the virtual sensor device, virtual sensor service to the mobile client device to virtualize one or more sensors of the mobile client device when the mobile client device is within a geo-fenced area;

wherein:
- providing comprises providing sensor data to the mobile client device or reporting sensor data to one or more recipients external to the mobile client device on behalf of the mobile client device;
- the geo-fenced area is jointly and dynamically negotiated by the mobile client device with one or more other devices;
- the virtual sensor device is to cause the mobile client device to place the one or more sensors in a reduced operational or non-operational state; and
- the provided sensor data supersedes the corresponding sensor(s) on the mobile client device.

24. The method of claim 23, wherein providing comprises providing to one or more mobile client devices, one or more configuration or operational policies for the one or more sensors on the one or more mobile client devices; wherein the one or more configuration or operational policies comprise one or more configuration or operational policies for the one or more sensors on the one or more mobile client devices, while the one or more mobile client devices are in a geo-fenced area.

25. The method of claim 24, further comprising providing, by a geo-fencing server of the virtual sensor device, to the one or more mobile client devices, the one or more configuration or operational policies for the one or more sensors on the one or more mobile client devices.

* * * * *